(12) United States Patent
Jo et al.

(10) Patent No.: US 9,217,578 B2
(45) Date of Patent: Dec. 22, 2015

(54) POWER DEVICE AND SAFETY CONTROL METHOD THEREOF

(75) Inventors: Su Ho Jo, Seongnam-si (KR); Kwan Joo Myoung, Suwon-si (KR); Ji Eun Lee, Seongnam-si (KR); O Do Ryu, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 888 days.

(21) Appl. No.: 13/067,899

(22) Filed: Jul. 5, 2011

(65) Prior Publication Data

US 2012/0033745 A1 Feb. 9, 2012

(30) Foreign Application Priority Data

Aug. 5, 2010 (KR) ........................ 10-2010-0075729

(51) Int. Cl.
*H04B 3/00* (2006.01)
*F24F 11/00* (2006.01)

(52) U.S. Cl.
CPC ....... *F24F 11/006* (2013.01); *F24F 2011/0067* (2013.01)

(58) Field of Classification Search
CPC .. F24F 11/006; F24F 2011/0067; H03C 3/40; H03C 3/406; H03D 13/00
USPC .......................... 454/201, 229, 239, 256, 370
See application file for complete search history.

(56) References Cited

U.S. PATENT DOCUMENTS

| 2,307,771 | A | * | 1/1943 | Denton et al. ................. 340/3.1 |
| 5,089,974 | A | * | 2/1992 | Demeyer et al. ............ 340/3.41 |
| 5,264,823 | A | * | 11/1993 | Stevens ......................... 375/238 |
| 5,694,109 | A | | 12/1997 | Nguyen et al. |

(Continued)

FOREIGN PATENT DOCUMENTS

| JP | 6-147604 | 5/1994 |
| JP | 10-84590 | 3/1998 |

(Continued)

OTHER PUBLICATIONS

Korean Office Action dated Nov. 17, 2014 in corresponding Korean Patent Application No. 10-2010-0075729.

(Continued)

*Primary Examiner* — Gregory Huson
*Assistant Examiner* — Dana Tighe
(74) *Attorney, Agent, or Firm* — Staas & Halsey LLP

(57) ABSTRACT

An air conditioner includes at least one indoor unit and a wired controller connected to the indoor unit through two lines to receive power from the indoor unit and to perform data communication with the indoor unit. Each of the indoor unit and the wired controller includes a communication unit that modulates a low-frequency communication signal into a high-frequency communication signal and transmits the high-frequency signal and demodulates a received high-frequency signal into a low-frequency signal. When a plurality of indoor units and a wired controller perform communication, a communication signal is transmitted after being modulated into a high-frequency signal and linking the high-frequency signal with DC power. This reduces the inductance of an inductor required to separate the linked high-frequency signal into DC power and a communication signal and the capacitance of a capacitor required to link the signal with DC power, reducing PCB size and inductor and capacitor costs.

20 Claims, 9 Drawing Sheets

(56) References Cited

U.S. PATENT DOCUMENTS

| | | | |
|---|---|---|---|
| 6,625,996 B2 * | 9/2003 | Nakajima et al. | 62/175 |
| 6,760,644 B2 * | 7/2004 | Canaday et al. | 700/245 |
| 7,434,744 B2 * | 10/2008 | Garozzo et al. | 236/51 |
| 7,521,900 B2 * | 4/2009 | Duff, Jr. | 320/166 |
| 7,633,358 B2 * | 12/2009 | Nakasha et al. | 333/138 |
| 7,841,542 B1 * | 11/2010 | Rosen | 236/51 |
| 2005/0005619 A1 | 1/2005 | Kojima et al. | |
| 2008/0054084 A1 | 3/2008 | Olson | |
| 2012/0033745 A1 | 2/2012 | Jo et al. | |

FOREIGN PATENT DOCUMENTS

| | | |
|---|---|---|
| JP | 2003-2483 | 1/2003 |
| JP | 2005-159921 | 6/2005 |
| JP | 2006-148340 | 6/2006 |
| JP | 2009-44774 | 2/2009 |
| JP | 2009-100469 | 5/2009 |
| KR | 10-2002-0055547 | 7/2002 |
| KR | 10-2008-0060713 | 7/2008 |
| KR | 10-2009-0035772 | 4/2009 |

OTHER PUBLICATIONS

Chinese Office Action issued Jan. 7, 2015 in corresponding Chinese Patent Application No. 201110220089.9.

Japanese Office Action issued Jun. 29, 2015 in corresponding Japanese Patent Application No. 2011-170004.

* cited by examiner

FIG. 8
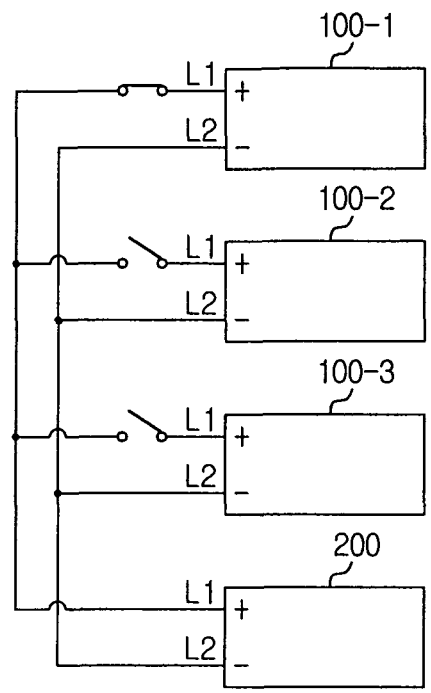
(a)
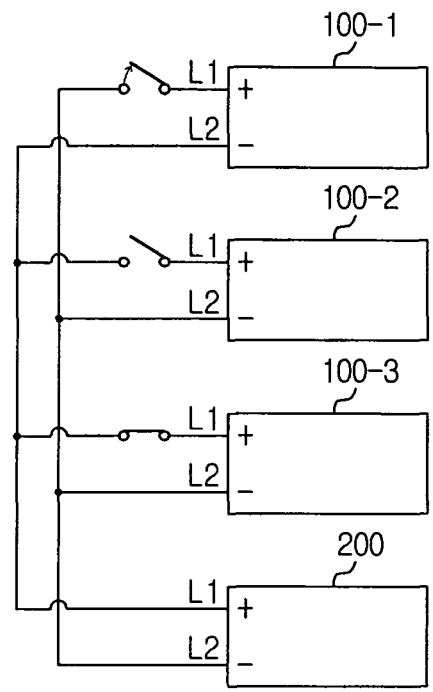
(b)

POWER DEVICE AND SAFETY CONTROL METHOD THEREOF

CROSS-REFERENCE TO RELATED APPLICATIONS

This application claims the benefit of Korean Patent Application No. 2010-0075729, filed on Aug. 5, 2010 in the Korean Intellectual Property Office, the disclosure of which is incorporated herein by reference.

BACKGROUND

1. Field

Embodiments of the present disclosure relate to an air conditioner and a communication method for the same, wherein power is supplied and communication is performed using two lines.

2. Description of the Related Art

A conventional air conditioner is an apparatus that cools, heats, or purifies air using transfer of heat generated through a refrigerant evaporation and compression cycle and then discharges the air for air conditioning in a specific indoor space.

The air conditioner includes an indoor unit installed in an indoor space, an outdoor unit that is installed outside the space and is connected to the indoor unit, and a controller that is electrically connected to the indoor unit to control operation of the indoor unit. The air conditioner also includes refrigerant tubes that are installed between the outdoor unit and the indoor unit to circulate refrigerant between the outdoor unit and the indoor unit according to a refrigerant cycle.

The controller is connected to the indoor unit by wire or wirelessly to control operation of the indoor unit. A multi-type air conditioner that is installed to provide air conditioning to a plurality of indoor spaces often uses a wired controller to control operation of indoor units since the wireless controller may be easily lost.

When such a wired controller is used, the indoor unit and the outdoor unit may be connected through two power lines and two communication lines and the indoor unit and the wired controller may be connected through two power lines and two communication lines.

That is, the indoor unit, the outdoor unit, and the wired controller are connected through the four lines and supply power through the two power lines and perform communication with each other through the two communication lines.

When such an air conditioner using a wired controller is installed, a service technician connects two power lines and two communication lines between an outdoor unit and an indoor unit and then connects refrigerant tubes between the outdoor unit and the indoor unit and also connects two power lines and two communication lines between the indoor unit and the wired controller.

Here, since the service technician should individually connect four lines between the indoor unit and the outdoor unit and four lines between the indoor unit and the wired controller, a large number of lines are required to install the air conditioner, increasing line costs and the likelihood of incorrect line connection of power lines and communication lines, thus increasing the likelihood of malfunction in communication circuits and incurring repair costs when a communication circuit malfunctions.

Especially, in the case where a multi-type air conditioner is installed, a great number of lines are used and great crosstalk occurs between lines, making communication unstable. In addition, as the number of indoor and outdoor units of the multi-type air conditioner increases, installation and management difficulties increase since the number of communication and power lines also increases.

SUMMARY

Therefore, it is an aspect of the present disclosure to provide an air conditioner and a communication method for the same, wherein a communication signal is transmitted after being modulated into a high-frequency communication signal when communication is performed between one or a plurality of indoor units and a wired controller.

It is another aspect of the present disclosure to provide an air conditioner and a communication method for the same, wherein a communication signal is transmitted in one of a sinusoidal waveform, a sawtooth waveform, or a triangular waveform when communication is performed between one or a plurality of indoor units and a wired controller.

It is another aspect of the present disclosure to provide an air conditioner and a communication method for the same, wherein disconnection between a plurality of indoor units and a wired controller is detected when the plurality of indoor units and the wired controller are connected through two lines.

It is another aspect of the present disclosure to provide an air conditioner and a communication method for the same, wherein one or a plurality of indoor units and a wired controller are connected through two lines to perform communication between the indoor units and a peripheral device and to transfer power between the indoor units and the wired controller.

It is another aspect of the present disclosure to provide an air conditioner and a communication method for the same, wherein power supply and communication may be performed even when two lines are erroneously connected with incorrect polarities between an indoor unit and a wired controller.

Additional aspects of the disclosure will be set forth in part in the description which follows and, in part, will be apparent from the description, or may be learned by practice of the disclosure.

In accordance with one aspect of the present disclosure, an air conditioner includes at least one indoor unit, and a wired controller connected to the at least one indoor unit through two lines to receive power from the at least one indoor unit and to perform data communication with the at least one indoor unit, wherein each of the at least one indoor unit and the wired controller includes a communication unit to modulate a low-frequency communication signal into a high-frequency communication signal and transmit the high-frequency communication signal when performing data communication and to demodulate a received high-frequency communication signal into a low-frequency communication signal.

The at least one indoor unit may further include a power transmitter to output power to the two lines to supply the power to the wired controller, and a signal linker to link the high-frequency communication signal with the two lines in which power flows, transmit the linked high-frequency communication signal to the wired controller, separate a received signal into a high-frequency communication signal and a power signal, and pass only the separated high-frequency communication signal.

The signal linker of the at least one indoor unit may include a capacitor and the power transmitter may include an inductor.

The wired controller may further include a power separator to pass only a power signal in a received signal, and a signal linker to link the high-frequency communication signal with the two lines in which power flows, transmit the linked high-frequency communication signal to the at least one indoor unit, separate a received signal into a high-frequency communication signal and a power signal, and pass only the separated high-frequency communication signal.

The signal linker of the wired controller may include a capacitor and the power separator may include an inductor.

The wired controller may further include a rectifier to rectify power input from the at least one indoor unit.

The high-frequency communication signal may have one of a sinusoidal waveform, a sawtooth waveform, or a triangular waveform.

A high-frequency communication signal transmitted through one of the two lines may be delayed in phase with respect to a high-frequency communication signal transmitted through the other line.

Each of the communication unit of the at least one indoor unit and the communication unit of the wired controller may demodulate a received high-frequency communication signal into a low-frequency communication signal using a voltage difference between high-frequency communication signals received through the two lines.

Each of the communication unit of the at least one indoor unit and the communication unit of the wired controller may demodulate a received high-frequency communication signal into a high-frequency communication signal when corresponding data has a value of 0.

The power may be DC power.

The at least one indoor unit may include a power detector to detect power provided through the two lines, and a switch unit that is driven upon detection of the power according to whether or not short-circuiting with another indoor unit has occurred.

The at least one indoor unit may further include a power supply unit to output DC power to the two lines, and a controller to control the power supply unit to supply power to the wired controller when no power is detected through the power detector.

The switch unit may be turned on when current having less than a reference current level is applied and may be turned off when current having the reference current level or higher is applied.

In accordance with another aspect of the present disclosure, a communication method for an air conditioner includes at least one indoor unit and a wired controller connected through two lines includes supplying power from the at least one indoor unit to the wired controller through the two lines, modulating a low-frequency communication signal into a high-frequency communication signal and transmitting the high-frequency communication signal by linking the high-frequency communication signal with the two lines, and demodulating, when a high-frequency communication signal is received through the two lines, the received high-frequency communication signal into a low-frequency communication signal and performing operation control based on the demodulated communication signal.

Demodulating the high-frequency communication signal into the low-frequency communication signal by the wired controller may include separating a received communication signal linked with the two lines into a high-frequency communication signal and power, supplying the separated power as drive power, and demodulating the separated high-frequency communication signal into a low-frequency communication signal.

Demodulating the high-frequency communication signal into the low-frequency communication signal by the indoor unit may include separating a received communication signal linked with the two lines into a high-frequency communication signal and power, and demodulating the separated high-frequency communication signal into a low-frequency communication signal.

Transmitting the high-frequency communication signal linked with the two lines may include transmitting the high-frequency communication signal through the two lines while delaying phase of the high-frequency communication signal to be transmitted in one of the two lines.

Demodulating the received high-frequency communication signal into a low-frequency communication signal may include demodulating a received high-frequency communication signal into a low-frequency communication signal using a voltage difference between high-frequency communication signals received through the two lines.

Modulating a low-frequency communication signal into a high-frequency communication signal may include modulating a low-frequency communication signal into a high-frequency communication signal when corresponding data has a value of 0.

The high-frequency communication signal may have one of a sinusoidal waveform, a sawtooth waveform, or a triangular waveform.

The method may further include detecting power between the at least one indoor unit and the wired controller during data communication between the at least one indoor unit and the wired controller, and controlling the at least one indoor unit to supply power to the wired controller when the power is not detected and controlling the at least one indoor unit to continue to supply power to the wired controller when the power is detected.

Continuing to supply power to the wired controller when the power is detected may include determining, upon detection of the power, whether or not current having a reference level or higher is applied to an indoor unit, stopping power supply from an indoor unit to which current having the reference level or higher is applied, and continuing to supply power to the wired controller through an indoor unit to which current having less than the reference level is applied.

Controlling the at least one indoor unit to supply power to the wired controller when the power is not detected may include controlling operation of a power supply unit of the at least one indoor unit when the power is not detected, identifying an indoor unit that initially supplies power to the wired controller, and supplying power from the identified indoor unit to the wired controller and stopping supply of power from other indoor units to the wired controller.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 8, parts (a) and (b), illustrate connection states of a plurality of indoor units provided in the multi-type air conditioner according to another embodiment.

DETAILED DESCRIPTION

Figure 1A:
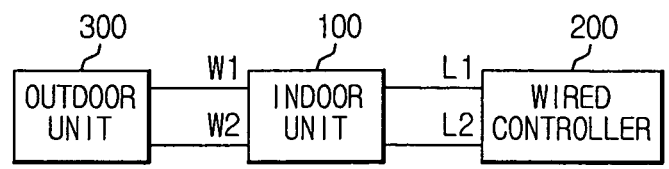
FIG. 1A illustrates a configuration of an air conditioner according to an embodiment of the present disclosure.

Reference will now be made in detail to the embodiments of the present disclosure, examples of which are illustrated in the accompanying drawings, wherein like reference numerals refer to like elements throughout.

FIG. 1A illustrates a configuration of an air conditioner according to an embodiment of the present disclosure. As shown in FIG. 1A, the air conditioner includes an indoor unit 100, a wired controller 200, and an outdoor unit 300.

The indoor unit 100 of the air conditioner is installed in an indoor space to maintain air in a pleasant condition in the indoor space and is connected to the wired controller 200 through two lines L1 and L2 and is connected to the outdoor unit 300 through a refrigerant tube(s) (not shown) and two lines W1 and W2.

The indoor unit 100 includes an indoor heat exchanger and an indoor fan. The indoor heat exchanger absorbs external heat while vaporizing liquid refrigerant conveyed from the outdoor unit 300 through the refrigerant tube after being expanded by an expansion unit in the outdoor unit 300. The indoor fan blows indoor air into the indoor heat exchanger.

The wired controller 200 is installed at a remote location from the indoor unit 100 to control operation of the indoor unit 100 and is connected to the indoor unit 100 through the two lines L1 and L2. The wired controller 200 receives drive power from the indoor unit 100 and performs data communication with the indoor unit 100 through the two lines L1 and L2.

The wired controller 200 includes a manipulation unit (not shown) that is manipulated to set operation mode information, target temperature information, or the like of the indoor unit 100 and a display unit (not shown) to display operation status information, indoor temperature information, indoor humidity information, and the like of the indoor unit 100.

Specifically, the wired controller 200 transmits a communication signal corresponding to at least one manipulation (or operation) of the manipulation unit associated with an operation mode, a target temperature, and the like of the indoor unit 100 to the indoor unit 100 and displays operation status information and the like of the indoor unit 100 corresponding to a communication signal transmitted from the indoor unit 100 on the display unit.

The wired controller 200 also displays information such as indoor temperature and humidity transmitted from various sensors (not shown) on the display unit.

The outdoor unit 300 is connected to the indoor unit 100 through a refrigerant tube(s) (not shown) and two lines W1 and W2 and distributes and controls flow of refrigerant circulating in the indoor unit 100.

More specifically, the outdoor unit 300 includes a compressor, an outdoor heat exchanger, an expansion unit such as a capillary tube, and an outdoor fan. The compressor compresses refrigerant into a high temperature, high pressure state. The outdoor heat exchanger emits internal latent heat to the outside while converting the high temperature, high pressure refrigerant compressed by the compressor into liquid. The expansion unit reduces the pressure of the refrigerant, which has been converted into liquid by the outdoor heat exchanger, by adjusting the flow rate of the refrigerant. The outdoor fan blows air to the outdoor heat exchanger.

The outdoor unit 300 supplies power to the indoor unit 100 and selectively drives the outdoor fan and the compressor according to a control signal from the indoor unit 100 and also distributes and controls flow of refrigerant circulating in the indoor unit 100.

Here, the compressor, the outdoor heat exchanger, and the expansion unit of the outdoor unit 300 are connected to each other through refrigerant tubes. A refrigerant tube connected to the expansion unit of the wired controller 200 is connected to an indoor heat exchanger of the indoor unit 100 through an external refrigerant tube (not shown). A communication unit (not shown) or the like of the outdoor unit 300 is connected to a communication unit of the indoor unit 100 through two lines W1 and W2 to transmit and receive data communication signals.

Figure 1B:
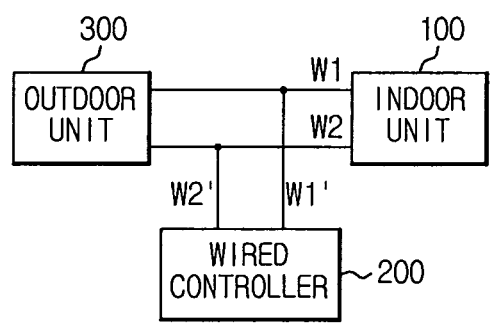
FIG. 1B illustrates a configuration of an air conditioner according to an embodiment of the present disclosure.

FIG. 1B illustrates an air conditioner that has different connection states between components from the air conditioner shown in FIG. 1A.

Specifically, in the air conditioner shown in FIG. 1B, a wired controller 200 is provided between an indoor unit 100 and an outdoor unit 300.

The indoor unit 100 of the air conditioner is connected to the outdoor unit 300 through a refrigerant tube(s) (not shown) and two lines W1 and W2.

The indoor unit 100 is connected to an external commercial power source and is connected to the wired controller 200 through two lines W1' and W2'. The indoor unit 100 rectifies external commercial power and provides the rectified power to the wired controller 200 and transmits and receives communication signals to and from the wired controller 200.

The wired controller 200 is installed at a remote location from the indoor unit 100 to control operation of the indoor unit 100.

The wired controller 200 is connected to the indoor unit 100 or the outdoor unit 300 through the two lines W1' and W2' to receive power from the indoor unit 100 or the outdoor unit 300 through the two lines W1' and W2'. Here, the wired controller 200 may select the indoor unit 100 or the outdoor unit 300 from which it receives power.

The two lines W1' and W2' of the wired controller 200 may also be connected to the two lines W1 and W2 between the indoor unit 100 and the outdoor unit 300.

The wired controller 200 performs data communication with the indoor unit 100 through the two lines W1' and W2'.

Here, the method in which the wired controller 200 receives power from the indoor unit 100 or the outdoor unit 300 and performs data communication with the indoor unit 100 is similar to the method described in the above embodiment.

The wired controller 200 includes a manipulation unit (not shown) that is manipulated to set operation mode information, target temperature information, or the like of the indoor unit 100 and a display unit (not shown) to display operation status information, indoor temperature information, indoor humidity information, and the like of the indoor unit 100.

Specifically, the wired controller 200 transmits a communication signal corresponding to at least one manipulation (or operation) of the manipulation unit associated with an operation mode, a target temperature, and the like of the indoor unit 100 to the indoor unit 100 and displays operation status information and the like of the indoor unit 100 corresponding to a communication signal transmitted from the indoor unit 100 on the display unit.

The wired controller 200 also displays information such as indoor temperature and humidity transmitted from various sensors (not shown) on the display unit.

The outdoor unit 300 is connected to an external commercial power source and is connected to the wired controller 200 through two lines W1' and W2'. The outdoor unit 300 rectifies external commercial power and provides the rectified power to the wired controller 200.

A configuration in which power is supplied from the outdoor unit 300 to the wired controller 200 is similar to a configuration in which power is supplied from the indoor unit 100 to the wired controller 200 in the above embodiment.

The outdoor unit 300 is connected to the indoor unit 100 through a refrigerant tube(s) (not shown) and two lines W1 and W2 and distributes and controls flow of refrigerant circulating in the indoor unit 100.

More specifically, the outdoor unit 300 is connected to the indoor unit 100 through the two lines W1 and W2 to transmit and receive data communication signals and selectively drives the outdoor fan and the compressor according to a control signal from the indoor unit 100 and also distributes and controls flow of refrigerant circulating in the indoor unit 100.

Figure 2:
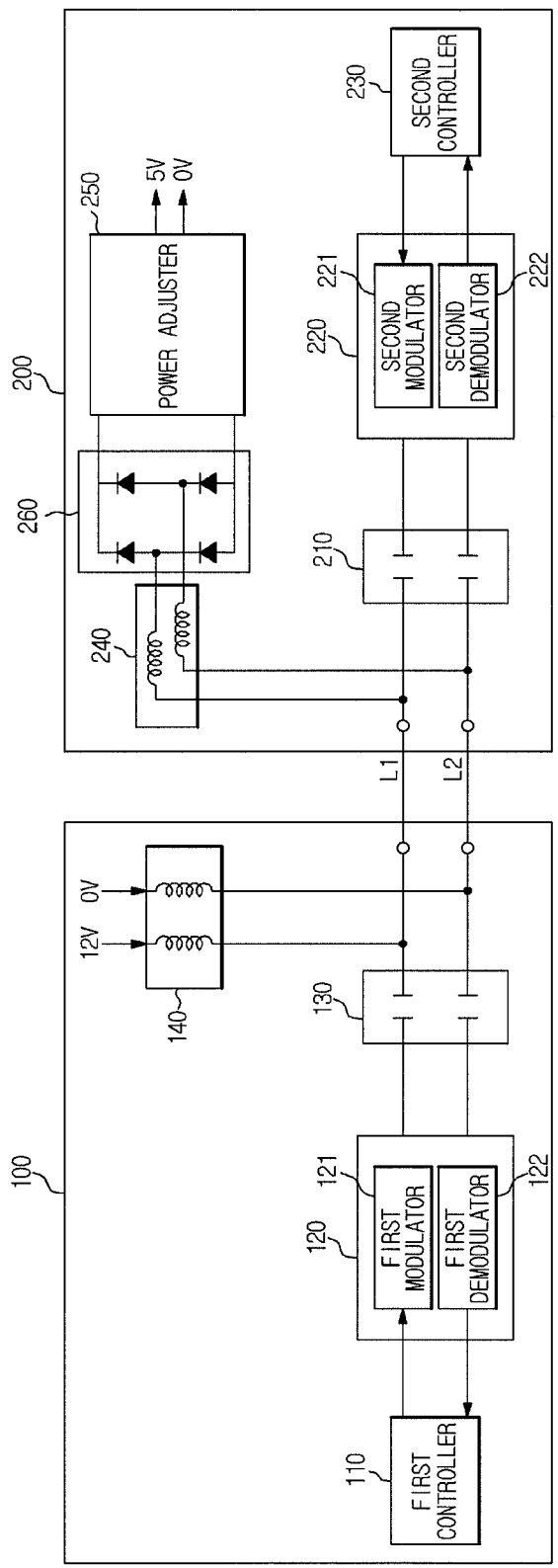
FIG. 2 illustrates detailed configurations of an indoor unit and a wired controller provided in an air conditioner according to an embodiment of the present disclosure.

FIG. 2 illustrates detailed configurations of an indoor unit 100 and a wired controller 200 which receives power from the indoor unit 100 and performs communication with the indoor unit 100 in an air conditioner according to an embodiment of the present disclosure. The following description will be given with reference to the wired controller 200 as an example. In the following description, reference is also made to FIG. 3, parts (a)-(d) and FIG. 4, parts (a)-(c).

Figure 3:
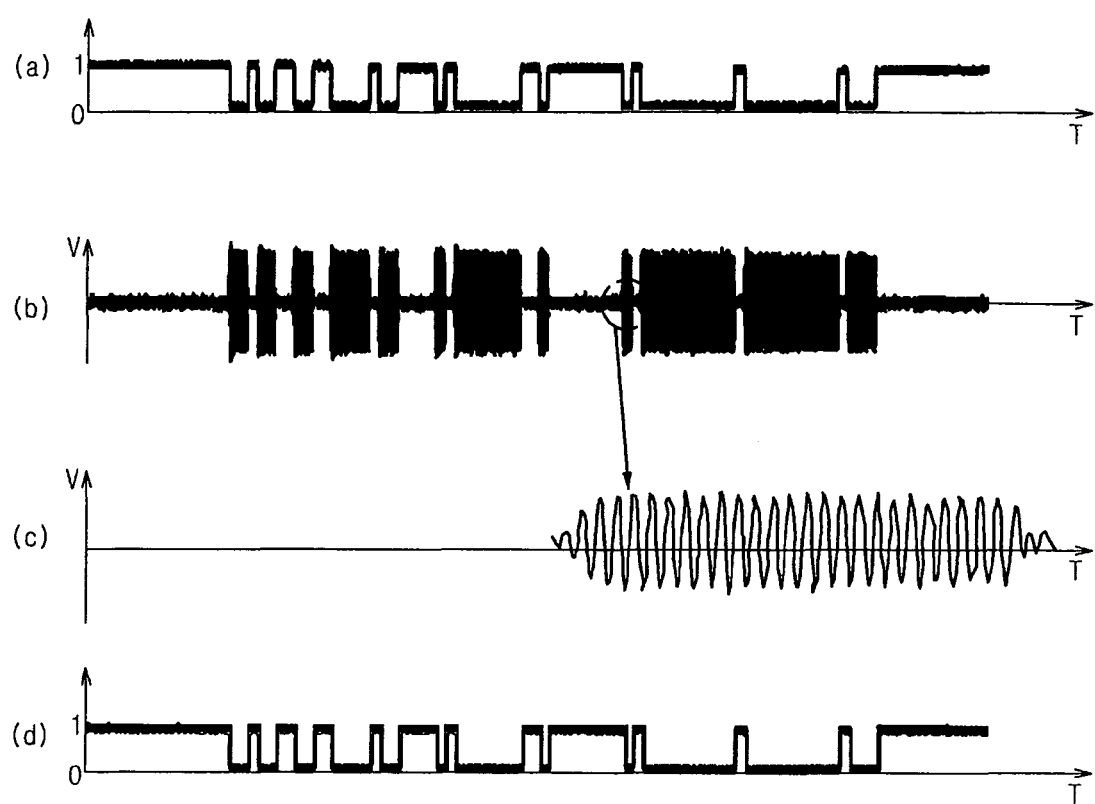
FIG. 3, parts (a)-(d), illustrates a waveform of a communication signal used in an air conditioner according to an embodiment of the present disclosure.
Figure 4:
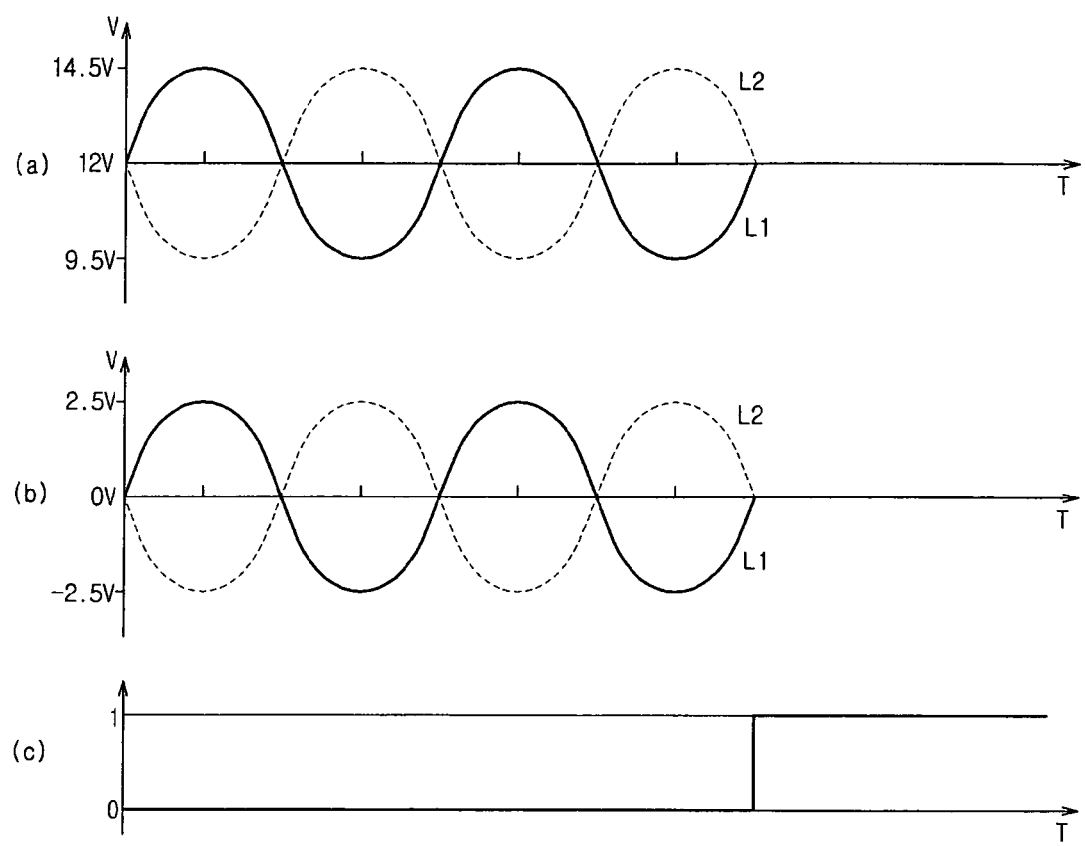
FIG. 4, parts (a)-(c), illustrates a waveform of a communication signal that is modulated and demodulated in an air conditioner according to an embodiment of the present disclosure.

FIG. 3, parts (a)-(d), illustrates a waveform of a communication signal that is modulated and demodulated by the indoor unit 100 or the wired controller 200 of the air conditioner according to an embodiment of the present disclosure and FIG. 4, parts (a)-(c), illustrates a waveform of a communication signal that is demodulated by the indoor unit 100 or the wired controller 200 of the air conditioner according to an embodiment of the present disclosure.

As shown in FIG. 2, the indoor unit 100 includes a first controller 110, a first communication unit 120, a first signal linker 130, and a power transmitter 140.

The first controller 110 in the indoor unit 100 controls overall operation of the indoor unit 100 according to a communication signal transmitted from the wired controller 200.

Specifically, the indoor unit 100 analyzes a communication signal transmitted from the wired controller 200 and controls operation of the indoor unit 100 according to the analyzed result. Here, the indoor unit 100 controls the operation of an indoor fan (not shown), a blade (not shown), or the like so that the temperature of the indoor space is maintained at a target temperature set by a user.

The first controller 110 transmits a communication signal (for example, a Universal Asynchronous Receiver Transmitter (UART) signal) corresponding to operation status information to the first communication unit 120.

Here, the UART signal transmitted to the first communication unit 120 from the first controller 110 is a low-frequency communication signal having a square waveform as shown in FIG. 3, part (a).

In the case where a temperature sensor and a humidity sensor are provided around the indoor unit 100, the first controller 110 may receive ambient temperature and humidity information around the indoor unit 100 and transmit a corresponding communication signal to the first communication unit 120.

The first communication unit 120 in the indoor unit 100 modulates a communication signal transmitted from the first controller 110 and transmits the modulated signal to the wired controller 200 through the first signal linker 130.

The first communication unit 120 delays the phase of a high-frequency communication signal that is to be transmitted through the line L2.

A phase delayer (not shown) may also be provided in the indoor unit 100 to delay the phase of a high-frequency communication signal that is to be transmitted through the line L2.

Upon receiving a communication signal corresponding to a command to control operation of the indoor unit 100 from the wired controller 200, the first communication unit 120 demodulates and transmits the communication signal to the first controller 110.

The first communication unit 120 includes a first modulator 121 and a first demodulator 122.

More specifically, the first modulator 121 modulates a low-frequency communication signal received from the first controller 110 into a high-frequency communication signal and transmits the high-frequency communication signal to the first signal linker 130.

As shown in FIG. 3, part (b), the first modulator 121 modulates a low-frequency communication signal received from the first controller 110 into a high-frequency communication signal by converting each section, which corresponds to data 1 (i.e., a data value of 1), of the communication signal received from the first controller 110 into a signal of 0 and each section, which corresponds to data 0 (i.e., a data value of 0), of the communication signal received from the first controller 110 into a high-frequency signal.

FIG. 3, part (c), is an enlarged section of the modulated high-frequency communication signal in FIG. 3, part (b). It may be seen from the waveform of FIG. 3, part (a), that the enlarged section of the high-frequency communication signal corresponds to data having a level of 0 (i.e., data 0).

As shown in FIG. 3, part (c), the waveform of the high-frequency communication signal is a non-square waveform which is one of a sinusoidal waveform, a triangular waveform, or a sawtooth waveform.

The high-frequency communication signal may also have a waveform similar to one of a sinusoidal waveform, a triangular waveform, or a sawtooth waveform.

The first demodulator 122 demodulates a high-frequency communication signal received from the wired controller 200 through the first signal linker 130 into a low-frequency communication signal and transmits the low-frequency communication signal to the first controller 110.

As shown in FIG. 3, part (d), the first demodulator 122 demodulates a high-frequency communication signal received through the first signal linker 130 into a low-frequency communication signal by converting each high-frequency communication signal section into data 0 and a section having a DC power level of about 12V into data 1.

How a high-frequency communication signal section is demodulated into data 0 is described below with reference to FIG. 4, parts (a)-(c). As shown in FIG. 4, part (a), high-frequency communication signals, which have the same voltage, have currents flowing in opposite directions, and a phase difference of a predetermined value (for example, about 180 degrees), are transmitted to the first signal linker 130 respectively through two lines L1 and L2, the line L1 being a positive terminal and the line L2 being a negative terminal. That is, the high-frequency communication signal which flows through the line L2 with a phase delay of about 180 degrees, is a phase-reversed version of the communication signal which flows through the line L1.

As shown in FIG. 4, part (b), when the high-frequency communication signals have passed through the first signal linker 130, DC voltages of the high-frequency communication signals are reduced through filtering of the first signal linker 130 and the high-frequency communication signals with the reduced voltages are input to the first demodulator 122 and the first demodulator 122 calculates a voltage difference between the high-frequency communication signals input through the lines. The first demodulator 122 amplifies a high-frequency communication signal section by 2 through calculation of the difference. When a communication signal section is amplified by 2, it is identified as a high-frequency communication signal section and is thus modulated into data 0 as shown in FIG. 4, part (c).

That is, the difference between high-frequency communication signals received through the lines is calculated to amplify the voltage level of the high-frequency communication signal by 2 so as to discriminate the high-frequency communication signal from a signal having a level of 0.

In addition, since a voltage difference between DC power signals received through the lines is 0, a section having only DC power is demodulated into data 1 by converting a communication signal section whose voltage difference is 0 into data 1.

The first signal linker 130 is connected to the first communication unit 120 and the power transmitter 140 and is also connected to the two lines L1 and L2.

The first signal linker 130 includes capacitor(s) and links DC power received from the power transmitter 140 with the high-frequency communication signals received through the first modulator 121 of the first communication unit 120 and then transmits the resulting signals to the wired controller 200 through the two lines L1 and L2.

Here, the high-frequency communication signals transmitted through the two lines L1 and L2 have the same voltage, have currents flowing in opposite directions, and a phase difference of a predetermined value (for example, about 180 degrees).

When the first signal linker 130 receives low-frequency communication signals from the wired controller 200 through the two lines L1 and L2, the first signal linker 130 transmits only the low-frequency communication signals to the first demodulator 122 of the first communication unit 120.

The power transmitter 140 is connected to a power source of about 12V and a power source of about 0V through two lines and receives DC power of about 12V from the power source of about 12V through one of the two lines and receives DC power of about 0V from the power source of about 0V through the other line.

The power transmitter 140 includes an inductor. Thus, the DC power signals of the power transmitter 140 are directly output to the two lines through the inductor. In this manner, the power transmitter 140 supplies power to the wired controller 200 through the two lines L1 and L2.

Here, since the power transmitter 140 is connected to the two lines L1 and L2 connected to the first signal linker 130, DC power transmitted from the power transmitter 140 is linked with the high-frequency communication signals transmitted from the first signal linker 130 and the resulting communication signals are transmitted to the wired controller 200.

When the power transmitter 140 has received a signal from the wired controller 200, the power transmitter 140 separates the received signal into a DC power signal and a communication signal and passes only the DC power signal.

That is, since the power transmitter 140 includes an inductor, the power transmitter 140 reduces the high-frequency communication signal through the inductor while passing only the DC power signal. Here, the DC power signal may be provided as drive power of another component.

As shown in FIG. 2, the wired controller 200 includes a second signal linker 210, a second communication unit 220, a second controller 230, a power separator 240, and a power adjuster 250.

The wired controller 200 further includes a rectifier (260).

The rectifier (260) transmits the DC power and high-frequency communication signals received from the indoor unit 100 to the second signal linker 210 and transmits communication signals received from the second controller 230 to the indoor unit 100.

The rectifier (260) allows DC power and communication signals to be normally transmitted and received between the indoor unit 100 and the wired controller 200 even when the indoor unit 100 and the wired controller 200 are connected through the two lines L1 and L2 with reversed polarities of positive and negative terminals thereof due to erroneous connection of the two lines L1 and L2 between the indoor unit 100 and the wired controller 200.

That is, even when the polarities of the two lines connected between the indoor unit 100 and the wired controller 200 are reversed, high-frequency communication signals may be correctly transmitted and received between the indoor unit 100 and the wired controller 200 since the high-frequency communication signals are transmitted and received between the indoor unit 100 and the wired controller 200 through the rectifier (260).

Here, the rectifier (260) includes a bridge diode which is a full wave rectification circuit. The bridge diode includes diodes which are alternately activated in a positive half period and a negative half period to obtain a full-wave rectified waveform.

The second signal linker 210 of the wired controller 200 is connected to the second communication unit 220 and the power separator 240 and is connected to the indoor unit 100 through two lines L1 and L2.

The second signal linker 210 includes capacitor(s). When the second signal linker 210 has received high-frequency communication signals linked with DC power from the indoor unit 100 through the two lines L1 and L2, the second signal linker 210 transmits only the high-frequency communication signals to a second demodulator 222 of the second communication unit 220. The high-frequency communication signals are transmitted to the second demodulator 222 after voltage thereof is reduced through the capacitor.

When the second signal linker 210 has received modulated high-frequency communication signals from the second communication unit 220, the second signal linker 210 links the modulated high-frequency communication signals with DC power received from the indoor unit 100 and transmits the linked high-frequency communication signals to the indoor unit 100 through the two lines L1 and L2. Here, the high-frequency communication signals transmitted through the two lines L1 and L2 have the same voltage, have currents flowing in opposite directions, and a phase difference of a predetermined value (for example, about 180 degrees).

The second communication unit 220 of the wired controller 200 generates high-frequency communication signals corresponding to an instruction from the second controller 230 and transmits the communication signals to the indoor unit 100.

Here, the second communication unit 220 delays the phase of the high-frequency communication signal to be transmitted through the line L2. That is, the phase of the high-frequency communication signal transmitted through the line L2 is delayed by about 180 degrees relative to the high-frequency communication signal transmitted through the line L1.

The second communication unit 220 receives a communication signal corresponding to an operation state of the indoor unit 100 from the indoor unit 100. The second communication unit 220 demodulates the communication signal received from the indoor unit 100 and transmits the demodulated communication signal to the second controller 230.

The following is a description of a method for modulating and demodulating communication signals by the second communication unit 220 of the wired controller 200, which is similar to the method for modulating and demodulating communication signals by the first communication unit 120 of the indoor unit 100 shown in FIG. 3, parts (a)-(d), and FIG. 4, parts (a)-c).

The second communication unit 220 includes a second modulator 221 and a second demodulator 222.

The second modulator 221 modulates a low-frequency communication signal received from the second controller 230 into a high-frequency communication signal and transmits the high-frequency communication signal to the second signal linker 210.

The second modulator 221 modulates a low-frequency communication signal received from the second controller 230 into a high-frequency communication signal by converting each section, which corresponds to data 1, of the communication signal received from the second controller 230 into a signal of 0 and each section, which corresponds to data 0, of the communication signal received from the second controller 230 into a high-frequency communication signal. Here, the waveform of the high-frequency communication signal is a non-square waveform which is one of a sinusoidal waveform, a triangular waveform, or a sawtooth waveform.

The high-frequency communication signal may also have a waveform similar to one of a sinusoidal waveform, a triangular waveform, or a sawtooth waveform.

The second demodulator 222 demodulates a high-frequency communication signal received from the second signal linker 210 into a low-frequency communication signal and transmits the low-frequency communication signal to the second controller 230.

Here, the second demodulator 222 demodulates a high-frequency communication signal received through the second signal linker 210 into a low-frequency communication signal by converting each high-frequency communication signal section into data 0 and a section having a predetermined frequency and DC power into data 1.

Here, a high-frequency communication signal section is demodulated into data 0 by calculating a voltage difference between high-frequency communication signals transmitted through the line L1 (corresponding to a positive terminal) and the line L2 (corresponding to a negative terminal) having a predetermined phase difference of, for example, about 180 degrees and then converting a high-frequency communication signal section, the level of which is amplified by 2 through calculation of the difference, into data 0.

The second controller 230 of the wired controller 200 analyzes a communication signal transmitted from the indoor unit 100 and controls overall operations and operation status display of the indoor unit 100 according to the analyzed result and controls output of a communication signal corresponding to manipulation of a manipulation unit (not shown) associated with target temperature setting, wind direction setting, operation mode setting, and the like.

Here, the communication signal corresponding to manipulation of the manipulation unit is a Universal Asynchronous Receiver Transmitter (UART) signal which is a low-frequency communication signal having a square waveform.

The power separator 240 of the wired controller 200 is connected to the indoor unit 100 through two lines L1 and L2. When the power separator 240 has received a high-frequency communication signal linked with DC power from the two lines L1 and L2, the power separator 240 separates the received communication signal into a DC power signal and a communication signal and passes only the DC power signal.

That is, since the power separator 240 includes an inductor, the power separator 240 reduces the high-frequency communication signal through the inductor while passing only the DC power signal. Here, the DC power signal is applied to the power adjuster 250.

The power adjuster 250 of the wired controller 200 includes a constant-voltage regulator. The power adjuster 250 adjusts DC power of about 12V provided from the indoor unit 100 using the constant-voltage regulator to DC power of about 5V that may be required to drive the wired controller 200 and provides the adjusted power as drive power to each component of the wired controller 200.

If a high-frequency communication signal is used as a communication signal linked with DC power as described above, it may be possible to reduce inductance of the inductors of the power transmitter and the power separator. Thus, it may be possible to reduce the size of the circuit board (PCB) and reduce inductor costs, thereby reducing circuit implementation costs.

In addition, in the case where the high-frequency communication signal is implemented as a communication signal having a square waveform, rising time noise occurs at edges of the square waveform. Rising time noise may be reduced by implementing the high-frequency communication signal as a communication signal having a non-square waveform such as a sinusoidal waveform, a triangular waveform, or a sawtooth waveform.

Figure 5:
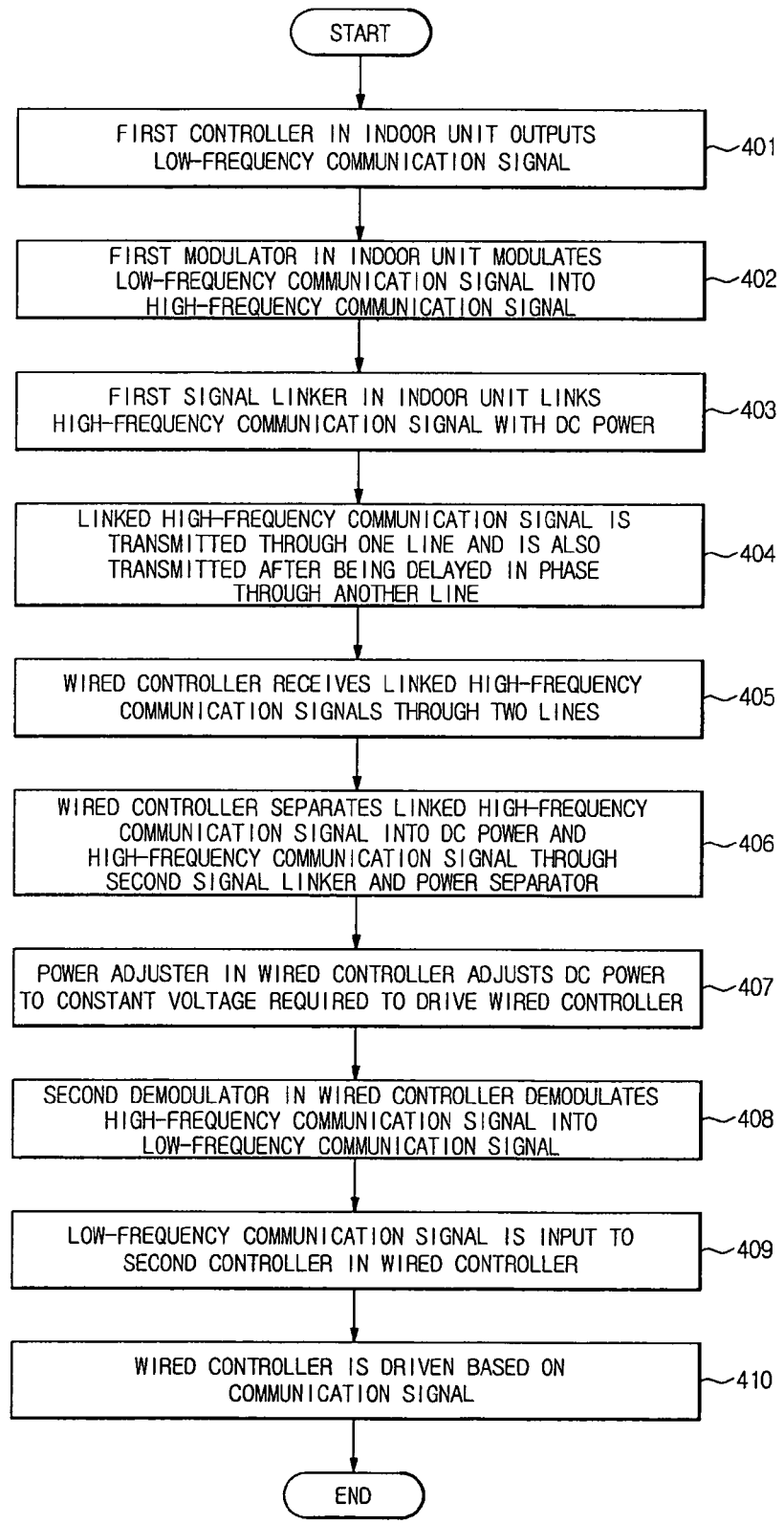
FIG. 5 is a flow chart of a communication method for an air conditioner according to an embodiment of the present disclosure.

FIG. 5 is a flow chart of a communication method for an air conditioner according to an embodiment of the present disclosure when a communication signal is transmitted from the indoor unit 100 to the wired controller 200.

The power transmitter 140 of the indoor unit 100 receives DC power of about 12V from the power sources of about 12V and 0V and provides the received DC power to the wired controller 200 through two lines L1 and L2.

While power is supplied from the indoor unit 100 to the wired controller 200 in this manner, the first controller 110 of the indoor unit 100 outputs a low-frequency communication signal to the first modulator 121 of the first communication unit 120 (401).

The first modulator 121 of the indoor unit 100 modulates the low-frequency communication signal into a high-frequency communication signal (402) and outputs the high-frequency communication signal to the first signal linker 130.

Here, the first modulator 121 maintains the low-frequency communication signal at a specific frequency when the data transmitted to the first controller 110 is "1" and modulates the low-frequency communication signal into a high-frequency communication signal when the data transmitted to the first controller 110 is "0".

Then, the high-frequency communication signal that has passed through the first signal linker 130 in the indoor unit 100 is linked with DC power output from the power transmitter 140 (403). Here, the voltage level of the communication signal is changed as the communication signal is linked with DC power of about 12V. That is, a high-frequency communication signal indicating data 0, linked with DC power of about 12V, has a peak voltage of about 14.5V and a communication signal having a specific frequency indicating data 1, linked with DC power of about 12V, has a peak voltage of about 12V.

The linked high-frequency communication signal is then transmitted to the wired controller 200 through the two lines L1 and L2.

Here, the linked high-frequency communication signal is transmitted without delay through the first line L1 among the two lines L1 and L2 and is transmitted after being delayed in phase by a predetermined value through the second line L2 (404).

Then, when the wired controller 200 has received the linked high-frequency communication signals through the two lines L1 and L2 (405), the wired controller 200 separates each of the linked high-frequency communication signals into DC power and a high-frequency communication signal using the power separator 240 and the second signal linker 210 (406).

Specifically, when the linked high-frequency communication signal is transmitted to the wired controller 200, only DC power included in the linked high-frequency communication signal passes through the power separator 240 which includes an inductor and the DC power is output to the power adjuster 250.

The power adjuster 250 adjusts DC power of about 12V received from the indoor unit 100 to DC power having a constant voltage of about 5V that may be required to drive the wired controller 200 (407) and the adjusted DC power of about 5V is supplied to each component of the wired controller 200.

In addition, when the linked high-frequency communication signal is transmitted to the wired controller 200, only a high-frequency communication signal included in the linked high-frequency communication signal passes through the second signal linker 210 which includes a capacitor and the high-frequency communication signal is then transmitted to the second demodulator 222 of the second communication unit 220.

The second demodulator 222 of the second communication unit 220 demodulates the high-frequency communication signal into a low-frequency communication signal (408) and then transmits the low-frequency communication signal to the second controller 230.

Here, the second demodulator 222 demodulates the high-frequency communication signal received through the second signal linker 210 into a low-frequency communication signal by converting each high-frequency communication signal section into data 0 and converting each section having a predetermined frequency or DC power into data 1.

Here, a high-frequency communication signal section is demodulated into data 0 by calculating a voltage difference between high-frequency communication signals received through the first line (L1: positive terminal) and the second line (L2: negative terminal) having a specific phase difference of, for example, about 180 degrees and converting a high-frequency communication signal section, the level of which is amplified by 2 through calculation of the difference, into data 0. Here, since a high-frequency communication signal, the level of which is amplified by 2 through calculation of the voltage difference between communication signals flowing through the two lines, is created in the demodulation procedure, the demodulated high-frequency communication signal is clearly discriminated from noise signals.

When the low-frequency communication signal is input to the second controller 230 of the wired controller 200 (409), the second controller 230 analyzes the low-frequency communication signal and controls operation of each component of the wired controller 200, such as display of an operation state of the indoor unit 100, according to the analyzed result (410).

A communication method similar to that of FIG. 5 is applied when a communication signal is transmitted from the wired controller 200 to the indoor unit 100.

A communication method similar to that of FIG. 5 is also applied to communication between the outdoor unit 300 and the indoor unit 100.

Figure 6:
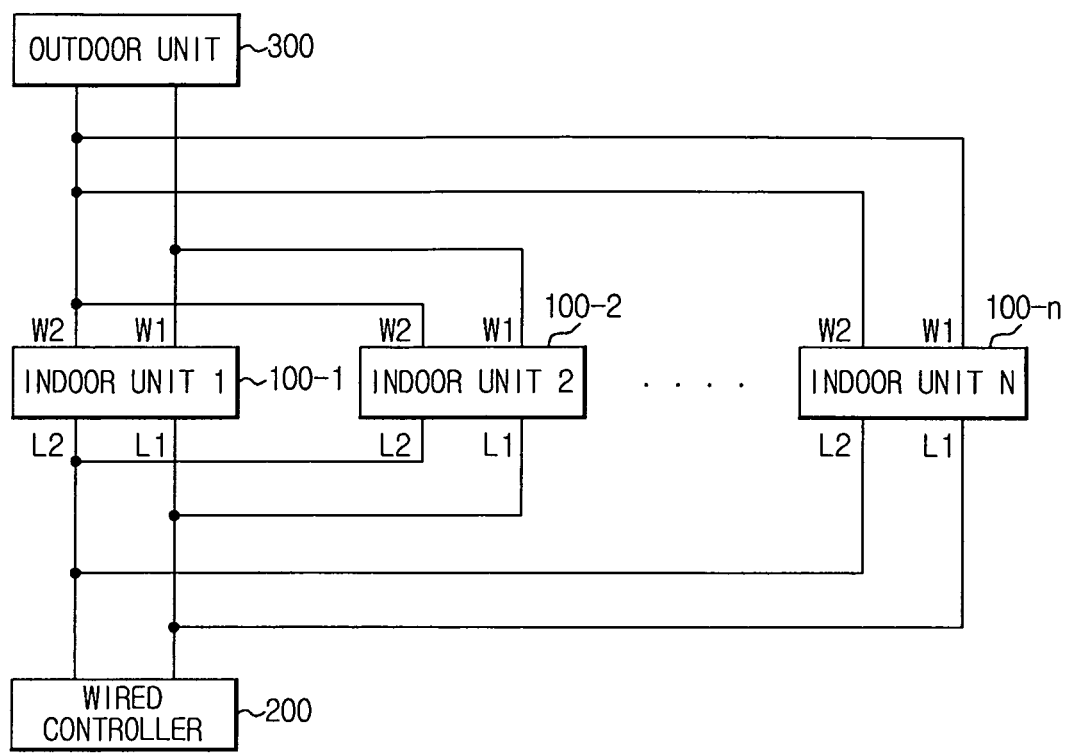
FIG. 6 shows a configuration of a multi-type air conditioner according to another embodiment of the present disclosure.

FIG. 6 shows a configuration of a multi-type air conditioner according to another embodiment of the present disclosure. As shown in FIG. 6, the multi-type air conditioner includes a plurality of indoor units 100-1, 100-2, . . . , and 100-n, a wired controller 200, and an outdoor unit 300.

The plurality of indoor units 100-1, 100-2, . . . , and 100-n is installed respectively in a plurality of indoor spaces to maintain air in a pleasant condition in the indoor spaces.

Each of the plurality of indoor units 100-1, 100-2, . . . , and 100-n is connected to the wired controller 200 through two lines L1 and L2 and is connected to the outdoor unit 300 through a refrigerant tube(s) (not shown) and two lines W1 and W2.

Each of the plurality of indoor units 100-1, 100-2, . . . , and 100-n includes an indoor heat exchanger and an indoor fan. The indoor heat exchanger absorbs external heat while vaporizing liquid refrigerant conveyed from the outdoor unit 300 through the refrigerant tube after being expanded by an expansion unit in the outdoor unit 300. The indoor fan blows indoor air into the indoor heat exchanger.

The wired controller 200 is installed at a remote location from the plurality of indoor units 100-1, 100-2, . . . , and 100-n to control operation of the plurality of indoor units 100-1, 100-2, . . . , and 100-n and is connected to the plurality of indoor units 100-1, 100-2, . . . , and 100-n through the two lines L1 and L2. The wired controller 200 receives drive power from at least one of the plurality of indoor units 100-1, 100-2, . . . , and 100-n and performs communication with the plurality of indoor units 100-1, 100-2, . . . , and 100-n through the two lines L1 and L2.

The wired controller 200 includes a manipulation unit (not shown) that is manipulated to set operation mode information, target temperature information, or the like of the plurality of indoor units 100-1, 100-2, . . . , and 100-n and a display unit (not shown) to display operation status information, indoor temperature information, indoor humidity information, and the like of the plurality of indoor units 100-1, 100-2, . . . , and 100-n.

Specifically, the wired controller 200 transmits a communication signal corresponding to at least one manipulation (or operation) of the manipulation unit associated with an operation mode, a target temperature, and the like of the plurality of indoor units 100-1, 100-2, . . . , and 100-n to the plurality of indoor units 100-1, 100-2, . . . , and 100-n and displays operation status information and the like of the plurality of indoor units 100-1, 100-2, . . . , and 100-n corresponding to a communication signal transmitted from the plurality of indoor units 100-1, 100-2, . . . , and 100-*n* on the display unit.

The wired controller 200 also displays information such as indoor temperature and humidity transmitted from various sensors (not shown) on the display unit.

The outdoor unit 300 is connected to each of the plurality of indoor units 100-1, 100-2, . . . , and 100-*n* through a refrigerant tube(s) (not shown) and two lines W1 and W2 and supplies power to each of the plurality of indoor units 100-1, 100-2, . . . , and 100-*n* and distributes and controls flow of refrigerant circulating in the plurality of indoor units 100-1, 100-2, . . . , and 100-*n*.

Here, a detailed description of a configuration of the outdoor unit 300 is omitted since the configuration of the outdoor unit 300 is similar to that of the outdoor unit of FIG. 1.

In addition, each of the plurality of indoor units 100-1, 100-2, . . . , and 100-*n* of the multi-type air conditioner transmits its ID information to the wired controller 200. The ID information of each of the plurality of indoor units 100-1, 100-2, . . . , and 100-*n* is set in the indoor unit to notify the wired controller 200 of a space where the indoor unit is installed when the indoor unit communicates with the wired controller 200.

Figure 7:
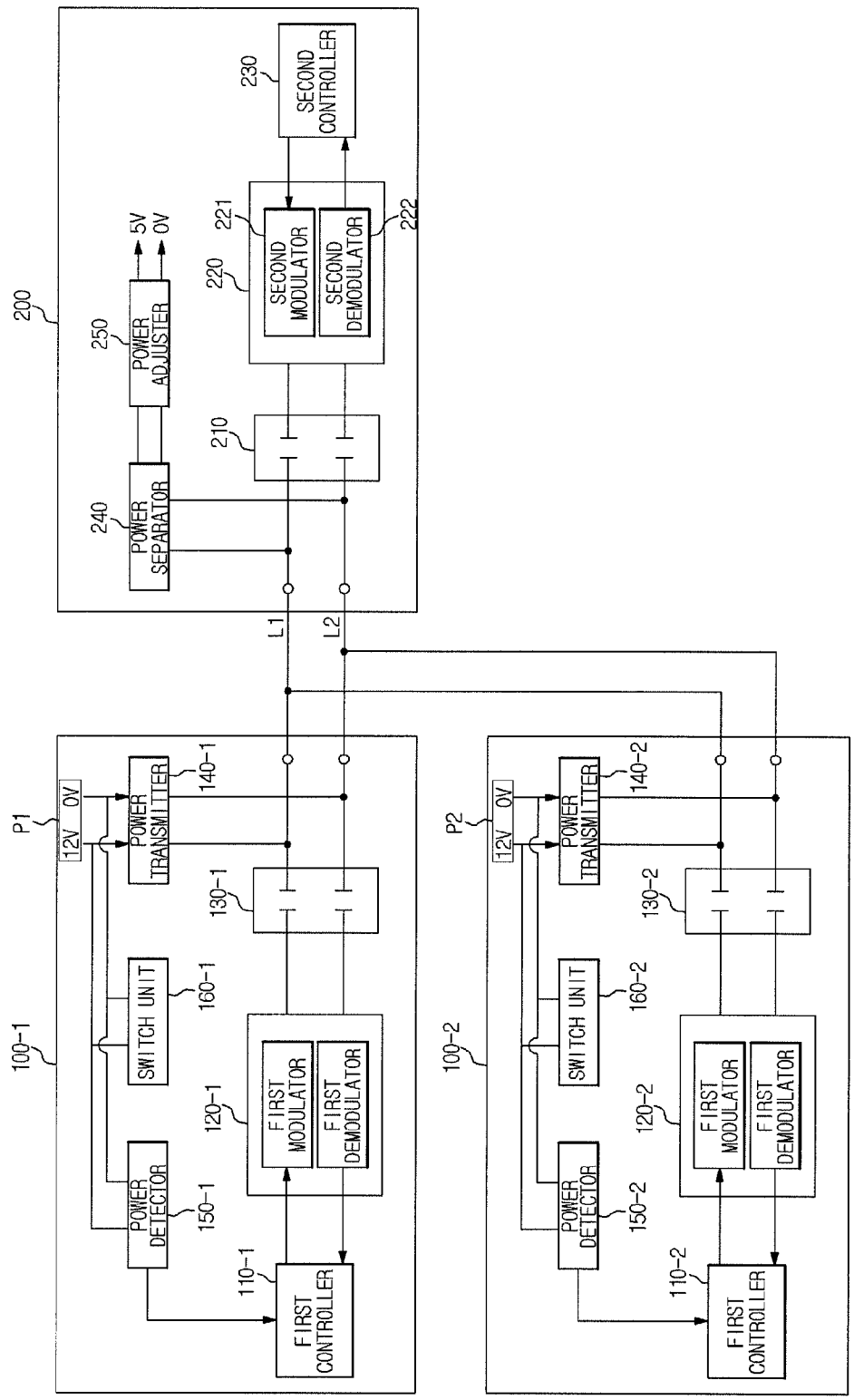
FIG. 7 illustrates a detailed configuration of a multi-type air conditioner according to another embodiment of the present disclosure.

FIG. 7 illustrates a detailed configuration of a multi-type air conditioner according to another embodiment of the present disclosure. The multi-type air conditioner according to this embodiment is described in detail below with reference to FIG. 7 in combination with FIG. 8 which illustrates connection states of a plurality of indoor units provided in the multi-type air conditioner according to this embodiment.

As shown in FIG. 7, a plurality of indoor units 100-1, 100-2, . . . of the multi-type air conditioner includes first controllers 110-1, 110-2, . . . , first communication units 120-1, 120-2, . . . , first signal linkers 130-1, 130-2, . . . , power transmitters 140-1, 140-2, . . . , power detectors 150-1, 150-2, . . . , and switch units 160-1, 160-2, . . . , respectively.

Here, a description of the first controller 110-1, 110-2, . . . , the first communication unit 120-1, 120-2, . . . , the first signal linker 130-1, 130-2, . . . , and the power transmitter 140-1, 140-2, . . . of each indoor unit of the multi-type air conditioner is omitted since the first controller 110-1, 110-2, . . . , the first communication unit 120-1, 120-2, . . . , the first signal linker 130-1, 130-2, . . . , and the power transmitter 140-1, 140-2, . . . are similar to the first controller 110, the first communication unit 120, the first signal linker 130, and the power transmitter 140 of the indoor unit of the air conditioner of the embodiment of FIG. 2.

Each of the power detectors 150-1, 150-2, . . . includes a photocoupler to detect power of a line and detects whether or not power is supplied from at least one of the plurality of indoor units 100-1, 100-2, . . . , and 100-*n* to the wired controller 200.

That is, the photocoupler of a corresponding one of the power detectors 150-1, 150-2, . . . is activated if power is supplied from at least one of the plurality of indoor units 100-1, 100-2, . . . , and 100-*n* to the wired controller 200 and the photocouplers of the power detectors 150-1, 150-2, . . . are not activated if no power is supplied from the plurality of indoor units 100-1, 100-2, . . . , and 100-*n* to the wired controller 200.

The first controllers 110-1, 110-2, . . . , and 110-*n* of the plurality of indoor units 100-1, 100-2, . . . , and 100-*n* determine whether or not power is supplied from at least one of the plurality of indoor units 100-1, 100-2, . . . , and 100-*n* to the wired controller 200 according to a power detection signal transmitted from the power detectors 150-1, 150-2, . . . . Upon determining that power is not supplied from the plurality of indoor units 100-1, 100-2, . . . , and 100-*n* to the wired controller 200, the first controllers 110-1, 110-2, . . . , and 110-*n* control respective power supply units P1, P2, . . . to supply power to the wired controller 200.

Here, let us assume that at least one of the plurality of indoor units 100-1, 100-2, . . . , and 100-*n* initially applies power to the lines while none of the plurality of indoor units 100-1, 100-2, . . . , and 100-*n* supplies power to the wired controller 200. Here, if an indoor unit, which is connected to the wired controller 200 with reversed polarities, also supplies power to the lines, short-circuiting occurs, increasing current flowing through the indoor unit above a reference current level. Here, the indoor unit that supplies power detects this state to control operation of the corresponding switch unit.

This method controls current of the two lines below a reference current level to protect the devices.

Each of the switch units 160-1, 160-2, . . . includes a relay or transistor.

As shown in FIG. 8, part (a), a corresponding one of the switch units 160-1, 160-2, . . . is activated if power is supplied from at least one indoor unit 100-1 among the plurality of indoor units 100-1, 100-2, . . . , and 100-*n* to the wired controller 200 and is not activated if power is not supplied from at least one indoor unit 100-2 or 100-3 among the plurality of indoor units 100-1, 100-2, . . . , and 100-*n* to the wired controller 200.

Each of the switch units 160-1, 160-2, . . . is turned off if current (i.e., overcurrent) above a preset reference current level flows in a corresponding indoor unit while power is supplied from the plurality of indoor units to the wired controller 200.

That is, as shown in FIG. 8, part (b), if power is supplied from the first and third indoor units 100-1 and 100-3 to the wired controller 200 while the first indoor unit 100-1 is erroneously connected to the wired controller 200 with different polarity from the second and third indoor units 100-2 and 100-3, current (i.e., overcurrent) above a preset reference current level flows in the two lines of the first indoor unit 100-1, thereby turning off the switch unit 160-1.

By driving each switch unit in the above manner when the plurality of indoor units are erroneously connected, it may be possible to prevent short-circuiting between the plurality of indoor units and to prevent malfunction of the circuit board (PCB).

Here, each of the switch units 160-1, 160-2, . . . may be turned on or off according to an instruction from a corresponding one of the first controllers 110-1, 110-2, . . . .

In addition, each of the switch units 160-1, 160-2, . . . is turned on according to an instruction from a corresponding one of the first controllers 110-1, 110-2, . . . if no power is supplied from the other indoor units 100-2, 100-3, . . . to the wired controller 200 when the corresponding indoor unit performs communication with the wired controller 200 upon erroneous connection. This may enable the corresponding indoor unit to perform communication with the wired controller 200 while supplying power to the wired controller 200.

Specifically, even when at least one of the plurality of indoor units and the wired controller 200 is erroneously connected through the two lines L1 and L2 due to reversal of the positive and negative polarities of the terminals of the two lines L1 and L2, the at least one indoor unit and the wired controller 200 may normally transmit and receive DC power and communication data signals since the wired controller 200 includes a rectifier (in FIG. 2, 260).

As shown in FIG. 7, the wired controller 200 of the multi-type air conditioner includes a second signal linker 210, a second communication unit 220, a second controller 230, a power separator 240, and a power adjuster 250.

The wired controller 200 may further include a rectifier (in FIG. 2, 260).

Here, a detailed description of the second signal linker 210, the second communication unit 220, the second controller 230, the power separator 240, and the power adjuster 250 is omitted since the second signal linker 210, the second communication unit 220, the second controller 230, the power separator 240, and the power adjuster 250 are similar to the wired controller 200 of the air conditioner according to the embodiment of FIG. 2 and only an additional feature of the second controller 230 is described below.

The second controller 230 may select one of the plurality of indoor units and may instruct the selected indoor unit to supply power to the outdoor unit and instruct the other indoor units to stop supplying power so that the outdoor unit receives power only from the selected indoor unit.

A method of performing communication between each indoor unit and the wired controller in this multi-type air conditioner is similar to the method of performing communication between the indoor unit and the wired controller in the air conditioner of the embodiment of FIG. 2.

Figure 9:
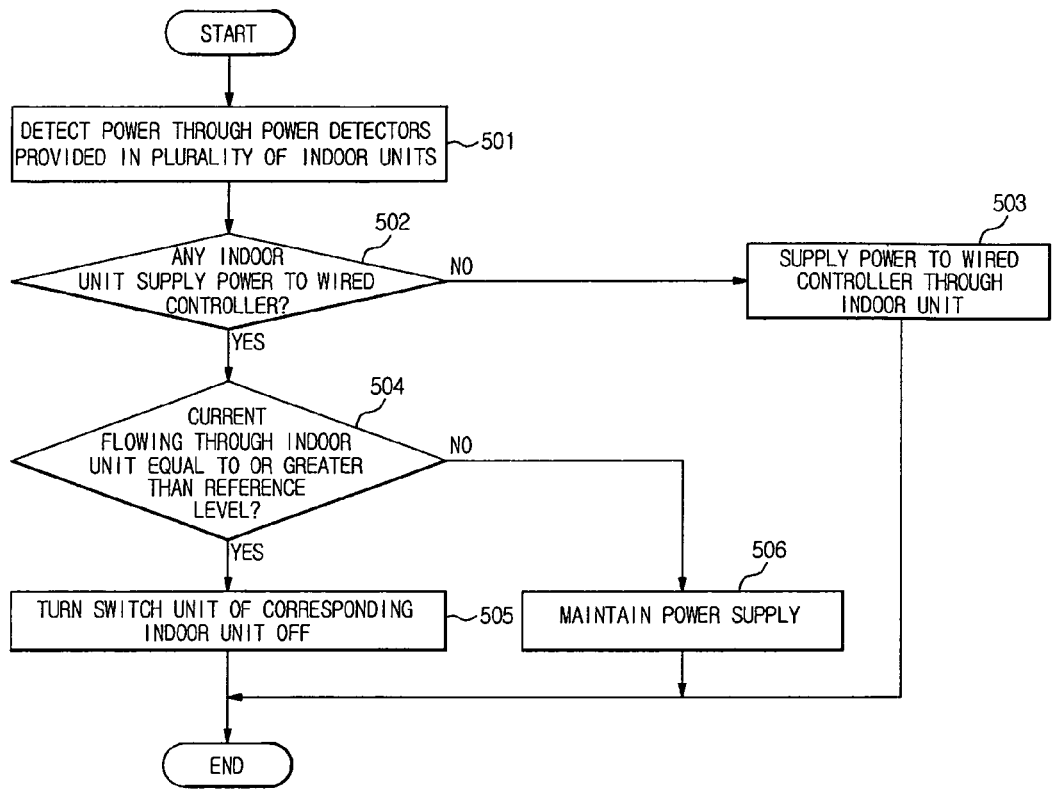
FIG. 9 is a flow chart of a method for supplying power in a multi-type air conditioner according to another embodiment of the present disclosure.

FIG. 9 is a flow chart of a method for supplying power in a multi-type air conditioner according to another embodiment of the present disclosure.

First, when at least one of the plurality of indoor units 100-1, 100-2, ..., and 100-$n$ performs communication with the wired controller 200, the plurality of indoor units 100-1, 100-2, ..., and 100-$n$ detects power supplied from the plurality of indoor units 100-1, 100-2, ..., and 100-$n$ to the wired controller 200 using the respective power detectors 150-1, 150-2, ... (501).

Here, the plurality of indoor units 100-1, 100-2, ..., and 100-$n$ determines whether or not power is supplied from at least one of the plurality of indoor units 100-1, 100-2, ..., and 100-$n$ to the wired controller 200 based on the power detection (502).

That is, when power has been detected through the power detectors 150-1, 150-2, ..., the plurality of indoor units 100-1, 100-2, ..., and 100-$n$ determines that power is supplied from at least one of the plurality of indoor units 100-1, 100-2, ..., and 100-$n$ to the wired controller 200 and, when no power has been detected through the power detectors 150-1, 150-2, ..., the plurality of indoor units 100-1, 100-2, ..., and 100-$n$ determines that power is not supplied from at least one of the plurality of indoor units 100-1, 100-2, ..., and 100-$n$ to the wired controller 200.

Here, when power is supplied from at least one of the plurality of indoor units 100-1, 100-2, ..., and 100-$n$ to the wired controller 200, the power supplied to the wired controller 200 is detected as the power detectors 150-1, 150-2, ... are turned on by the power and, when power is not supplied from the plurality of indoor units 100-1, 100-2, ..., and 100-$n$ to the wired controller 200, the power supplied to the wired controller 200 is not detected as the power detectors 150-1, 150-2, ... are turned off.

In the case where it is detected that power is not supplied from at least one of the plurality of indoor units 100-1, 100-2, ..., and 100-$n$ to the wired controller 200, the power units P1, P2, ... of the plurality of indoor units 100-1, 100-2, ..., and 100-$n$ are activated sequentially in a predetermined order at regular time intervals to supply power to the wired controller 200. Here, the power supplied to the wired controller 200 is detected through the power detectors 150-1, 150-2, ....

When power supplied to the wired controller 200 is first detected through the power detectors 150-1, 150-2, ..., an indoor unit having a power supply unit P1, P2, ... that supplies power to the wired controller 200 is determined and supply of power from the determined indoor unit to the wired controller 200 is maintained (503). Here, supply of power from the other indoor units to the wired controller 200 is stopped.

In addition, in the case where one indoor unit determines whether or not another indoor unit supplies power to the wired controller 200 in order to perform communication with the wired controller 200, the indoor unit may control, upon determining that none of the other indoor units supplies power to the wired controller 200, its power supply unit P1, P2, ... to directly supply power to the wired controller 200 without sequential control of the plurality of indoor units.

On the other hand, in the case where power is supplied from at least one of the plurality of indoor units 100-1, 100-2, ..., and 100-$n$ to the wired controller 200, each indoor unit detects current flowing through two lines connected to the indoor unit to determine whether or not the detected current level is equal to or higher than a preset reference current level (504).

Here, the indoor unit turns a corresponding switch unit off to stop supplying power to the wired controller 200 upon determining that the detected current level is equal to or higher than the preset reference current level (505) and turns the corresponding switch unit on to continue to supply power to the wired controller 200 upon determining that the detected current level is less than the preset reference current level (506).

Current having the preset reference current level or higher flows through the indoor unit when the indoor unit is erroneously connected to the wired controller 200 with different polarity from other indoor units. Thus, upon determining that current having the preset reference current level or higher flows through the indoor unit, the indoor unit turns the switch unit off to prevent short-circuiting with other indoor units.

Power supply between the indoor unit 100 and the outdoor unit 300 is performed in the same manner as shown in FIG. 9.

The methods for power supply and communication between an indoor unit(s) and a wired controller in the embodiments described above with reference to FIGS. 1 to 9 may be applied to any devices that are connected through two lines to perform DC power supply and communication with each other.

For example, the methods may be applied to power supply and communication between an indoor unit and an outdoor unit of an air conditioner, between an indoor unit, an outdoor unit, and a wired controller of a multi-type air conditioner, between a main body and a wired controller of a boiler, and between a master device and a slave device.

As is apparent from the above description, an air conditioner and a communication method for the same according to the embodiments of the present disclosure have a variety of advantages. For example, in accordance with one aspect of the present invention, when a plurality of indoor units and a wired controller perform communication with each other, a communication signal is transmitted and received after being modulated into a high-frequency communication signal and linking the high-frequency communication signal with DC power, and therefore it may be possible to reduce the inductance of an inductor used to separate the linked high-frequency communication signal into DC power and a communication signal and it may also be possible to reduce the size of a circuit board (PCB) as the inductance of the inductor is reduced, thereby reducing inductor costs.

In addition, since a communication signal is transmitted and received after being modulated into a high-frequency communication signal and linking the high-frequency communication signal with DC power, it may be possible to reduce the capacitance of a capacitor used to link the communication signal with DC power and it may also be possible to reduce the size of a circuit board (PCB) as the capacitance of the capacitor is reduced, thereby reducing capacitor costs.

Further, since a circuit to convert a low-frequency communication signal into a high-frequency communication signal is simpler than a circuit to convert a low-frequency communication signal into an Alternate Mark Inversion (AMI) signal, it may be possible to easily implement the circuit and to reduce costs required to implement the circuit.

Furthermore, since the high-frequency communication signal is implemented in a non-square waveform such as a sinusoidal waveform, a sawtooth waveform, or a triangular waveform, it may be possible to reduce electromagnetic noise such as EMI noise.

In accordance with another aspect of the present disclosure, since one or a plurality of indoor units and a wired controller are connected through two lines, it may be possible to reduce the number of lines (or cables), thereby reducing inter-line noise.

In addition, since each of the plurality of indoor units includes a switch unit, it may be possible to stop supply of power from an indoor unit, which is erroneously connected causing short-circuiting with other indoor units, to the wired controller by turning a corresponding switch unit off.

Further, the plurality of indoor units may be provided with respective power detectors and the power detectors may be sequentially activated to identify an indoor unit(s) which supplies power to the wired controller. When a plurality of indoor units, which supply power to the wired controller, is identified, one of the indoor units may be selected to supply power to the wired controller.

Furthermore, since differential signals, which flow in opposite directions (i.e., have a phase delay of 180 degrees with respect to each other), are transmitted through two lines connected between an indoor unit and the wired controller, noise of the two lines may be canceled to reduce the level of an electromagnetic wave emitted from the two lines to about 0, thereby significantly reducing noise.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An air conditioner comprising:
   at least one indoor unit; and
   a wired controller connected to the at least one indoor unit through two lines to receive power from the at least one indoor unit and to perform data communication with the at least one indoor unit,
   wherein each of the at least one indoor unit and the wired controller comprises a communication unit to modulate a first frequency communication signal into a second frequency communication signal and transmit the second frequency communication signal when performing data communication and to demodulate a received second frequency communication signal into a first frequency communication signal, and
   wherein the communication unit of the wired controller demodulates the received second frequency communication signal into the first frequency communication signal using a voltage difference between second frequency communication signals received through the two lines, and
   wherein second frequencies of the second frequency communication signals each are higher than first frequencies of the first frequency communication signals.

2. The air conditioner according to claim 1, wherein the at least one indoor unit further comprises:
   a power transmitter to output power to the two lines to supply the power to the wired controller; and
   a signal linker to link the second frequency communication signal with the two lines in which power flows, transmit the linked second frequency communication signal to the wired controller, separate a received signal into a second frequency communication signal and a power signal, and pass only the separated second frequency communication signal.

3. The air conditioner according to claim 2, wherein the signal linker of the at least one indoor unit comprises a capacitor and the power transmitter comprises an inductor.

4. The air conditioner according to claim 1, wherein the wired controller further comprises:
   a power separator to pass only a power signal in a received signal; and
   a signal linker to link the second frequency communication signal with the two lines in which power flows, transmit the linked second frequency communication signal to the at least one indoor unit, separate a received signal into a second frequency communication signal and a power signal, and pass only the separated second frequency communication signal.

5. The air conditioner according to claim 4, wherein the signal linker of the wired controller comprises a capacitor and the power separator comprises an inductor.

6. The air conditioner according to claim 1, wherein the wired controller further comprises a rectifier to rectify power input from the at least one indoor unit.

7. The air conditioner according to claim 1, wherein the second frequency communication signal has one of a sinusoidal waveform, a sawtooth waveform, or a triangular waveform.

8. The air conditioner according to claim 1, wherein a second frequency communication signal transmitted through one of the two lines is delayed in phase with respect to a second-frequency communication signal transmitted through the other line.

9. The air conditioner according to claim 8, wherein each of the communication unit of the at least one indoor unit demodulates a received second frequency communication signal into a first frequency communication signal using a voltage difference between second frequency communication signals received through the two lines.

10. The air conditioner according to claim 9, wherein each of the communication unit of the at least one indoor unit and the communication unit of the wired controller demodulates a received second frequency communication signal into a second frequency communication signal when corresponding data has a value of 0.

11. The air conditioner according to claim 1, wherein the power is DC power.

12. The air conditioner according to claim 1, wherein the at least one indoor unit comprises:
   a power detector to detect power provided through the two lines;
   a switch unit that is driven upon detection of the power according to whether or not short-circuiting with another indoor unit has occurred;

a power supply unit to output DC power to the two lines; and a controller to control the power supply unit to supply power to the wired controller when no power is detected through the power detector.

13. The air conditioner according to claim 12, wherein the switch unit is turned on when current having less than a reference current level is applied and is turned off when current having the reference current level or higher is applied.

14. A communication method for an air conditioner comprising at least one indoor unit and a wired controller connected through two lines, the method comprising:

supplying power from the at least one indoor unit to the wired controller through the two lines;

modulating a first frequency communication signal into a second frequency communication signal and transmitting the second frequency communication signal by linking the second frequency communication signal with the two lines; and demodulating, when a second frequency communication signal is received through the two lines, the received second frequency communication signal into a first frequency communication signal and performing operation control based on the demodulated communication signal, wherein demodulating the received second frequency communication signal into the first frequency communication signal comprises demodulating the received second frequency communication signal into the first frequency communication signal using a voltage difference between second frequency communication signals received through the two lines, and wherein second frequencies of the second frequency communication signals each are higher than first frequencies of the first frequency communication signals.

15. The method according to claim 14, wherein demodulating the second frequency communication signal into the first frequency communication signal by the wired controller comprises:

separating a received communication signal linked with the two lines into a second frequency communication signal and power;

supplying the separated power as drive power; and
demodulating the separated second frequency communication signal into a first frequency communication signal.

16. The method according to claim 14, wherein demodulating the second frequency communication signal into the first frequency communication signal by the indoor unit comprises:

separating a received communication signal linked with the two lines into a second frequency communication signal and power; and demodulating the separated second frequency communication signal into a first frequency communication signal.

17. The method according to claim 14, wherein transmitting the second frequency communication signal linked with the two lines comprises:

transmitting the second frequency communication signal through the two lines while delaying phase of the second frequency communication signal to be transmitted in one of the two lines.

18. The method according to claim 14, wherein modulating a first frequency communication signal into a second frequency communication signal comprises modulating a first frequency communication signal into a second frequency communication signal when corresponding data has a value of 0.

19. The method according to claim 14, wherein the second frequency communication signal has one of a sinusoidal waveform, a sawtooth waveform, or a triangular waveform.

20. The method according to claim 14, further comprising:

detecting power between the at least one indoor unit and the wired controller during data communication between the at least one indoor unit and the wired controller; and controlling the at least one indoor unit to supply power to the wired controller when the power is not detected and controlling the at least one indoor unit to continue to supply power to the wired controller when the power is detected, wherein continuing to supply power to the wired controller when the power is detected comprises:

determining, upon detection of the power, whether or not current having a reference level or higher is applied to an indoor unit;

stopping power supply from an indoor unit to which current having the reference level or higher is applied; and continuing to supply power to the wired controller through an indoor unit to which current having less than the reference level is applied, and wherein controlling the at least one indoor unit to supply power to the wired controller when the power is not detected comprises:

controlling operation of a power supply unit of the at least one indoor unit when the power is not detected;

identifying an indoor unit that initially supplies power to the wired controller; and supplying power from the identified indoor unit to the wired controller and stopping supply of power from other indoor units to the wired controller.

* * * * *